United States Patent [19]
Kirchgaessner et al.

[11] Patent Number: 5,306,783
[45] Date of Patent: Apr. 26, 1994

[54] RESIN SOLUTION FOR THE IMPREGNATION OF PAPER WEBS

[75] Inventors: Uwe Kirchgaessner, Frankenthal; Jakob Decher, Bobenheim-Roxheim; Christof Jaeckh, Heidelberg; Otto Wittmann, Frankenthal; Manfred Niessner, Schifferstadt; Harro Petersen, Frankenthal, all of Fed. Rep. of Germany

[73] Assignee: BASF Aktiengesellschaft, Ludwigshafen, Fed. Rep. of Germany

[21] Appl. No.: 985,312

[22] Filed: Dec. 4, 1992

[30] Foreign Application Priority Data

Dec. 4, 1991 [DE] Fed. Rep. of Germany ....... 4139961

[51] Int. Cl.$^5$ .............................................. C08L 61/02
[52] U.S. Cl. .................................. 525/398; 528/230; 528/254; 528/256
[58] Field of Search ...................... 528/230, 254, 256; 525/398

[56] References Cited

U.S. PATENT DOCUMENTS 3,772,225 11/1973 Avis .

FOREIGN PATENT DOCUMENTS 2389694 12/1978 France .

OTHER PUBLICATIONS

CA109(18):150706t.

*Primary Examiner*—Samuel A. Acquah
*Attorney, Agent, or Firm*—Oblon, Spivak, McClelland, Maier & Neustadt

[57] ABSTRACT

An aqueous resin solution for the impregnation of paper webs contains 2-40 parts by weight of a polyurea composed of urea and of a polyamine per 100 parts by weight of a melamine/formaldehyde precondensate. The impregnated paper webs are suitable for coating woodbase materials, especially chipboard.

2 Claims, No Drawings

RESIN SOLUTION FOR THE IMPREGNATION OF PAPER WEBS

The present invention relates to the use of modified melamine resin solutions for the impregnation of paper webs and to the subsequent coating of woodbase materials.

Woodbase materials, especially chipboard, which are coated with aminoplastic-impregnated paper webs are used in the manufacture of, for example, furniture components and work surfaces. of The impregnation confers the required hardness, resistance to chemicals, and heat and flame resistance on the surface of the furniture. A distinction is made in this connection between multi-layer laminates and monolayer paper films.

Laminates are produced by compressing a plurality of impregnated paper webs together, an increasingly important process being the CPL (Continuous Pressed Laminate) process, in which the paper webs are compressed under pressures from 25 to 50 bar in twin belt presses. In this case, the reactive melamine resins are superior to the phenol resins formerly used. Pure melamine resins are, however, too brittle; paper laminates manufactured from them tend to break on rolling up and, especially, on subsequent shaping. This is why attempts have been made to modify the melamine resins by adding high-boiling polyols such as diethylene glycol, butanediol or sucrose; however, laminates produced therewith have low gloss, and they tend to blister especially in the steam test and on contact with boiling water. In addition, polyols tend to migrate out of the laminate during processing of the resin. It is therefore an object of the present invention to provide impregnated paper laminates which do not have the said disadvantages.

Furniture components not exposed to great mechanical stress are coated with a monolayer decorative film, the woodbase material being coated with the impregnated paper film directly in short-cycle presses with short compression times and under low pressure. Use of melamine resin modified with polyols for impregnation of the paper web in this case results in matt surfaces. It was therefore another object of the present invention to provide impregnated decorative films which give, on coating by the short-cycle process, decorative surfaces which comply with the DIN 53 799 standard and have high gloss.

We have found that these objects are achieved by employing as resin solution for impregnating paper webs a melamine resin which is modified with a polyurea.

U.S. Pat. No. 3,772,225 describes the preparation of polyureas from polyamines and urea and the use thereof for producing water-resistant paper and printing inks. No mention is made of flexibilizing or gloss-improving properties of this class of compound. No mention is made of a use of the polyureas for modifying melamine resins.

DE-A 40 27 384, which was not prior-published, describes the use of aminoplastic resins which contain at least 0.5% by weight of a polyurea as binder for woodbase materials.

The present invention relates to an aqueous resin solution for impregnating paper webs which contains 2–40 parts by weight (based on solids) of a polyurea of the formula

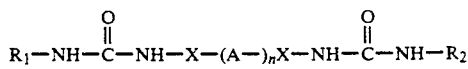

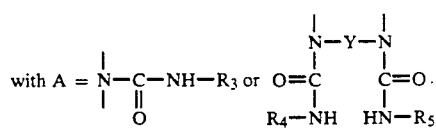

$Y = C_1$–$C_6$-alkylene $n = 0$ or $1$ $X = C_1$–$C_6$-alkylene, $C_5$–$C_6$-cycloalkylene, $C_1$–$C_6$-hydroxyalkylene or $C_4$–$C_{18}$oxyalkylene, $R_1$–$R_5 = H$ or $CH_2OH$ per 100 parts by weight of a melamine/formaldehyde precondensate.

Melamine resins for the purpose of the present invention are precondensates of melamine and formaldehyde in which the molar ratio of melamine to formaldehyde is preferably from 1:1.3 to 1:2.5. The condensation of melamine and formaldehyde takes place under conventional conditions in a basic medium at pH 8–10 and at 80°–100° C.

Also suitable are cocondensates in which up to 10% by weight of the melamine is replaced by urea. The preparation of cocondensates of this type is known and is normally carried out at pH 8–10 and at 70°–100° C.

The endpoint of the condensation is determined from the cloud point which is measured by mixing 1 g of the reaction mixture with 5 times the amount of water and recording the temperature at which permanent cloudiness appears.

The condensation is normally carried out until the cloud point is 40°–60° C.

The precondensates can also be prepared using conventional modifiers such as ethylene glycol, diethylene glycol, phenylglycol or other polyols including, for example, sugar derivatives or ε-caprolactam, in amounts of from 1 to 10% of the weight of solids in the unmodified resin solution.

The resin solutions obtained in this way generally have solids contents of 40–70% by weight. The solids content is defined in this context as the residue on drying which is found by drying 1 g of resin solution in an oven at 120° C. for 2 hours.

Polyureas and the preparation thereof are described in Ullmann's Encyclopädie der Technischen Chemie, 3rd edition, Volume 8, page 389 et seq.

The polyureas of the formula (I) are prepared in aqueous solution. A polyamine with primary or secondary amino groups is reacted with urea at elevated temperature, with elimination of ammonia, to give the corresponding polyurea.

Suitable polyamines are alkylenediamines, dialkylenetriamines, polyalkylenepolyamines and functional polyamines, for example ethylenediamine, 1,3-propylenediamine, diethylenetriamine, dipropylenetriamine, triethylenetetramine, hexamethylenediamine, ether diamines, polyether diamines etc.

The polyureas are prepared by reacting the polyamines with the theoretically required amount, but advantageously with a small excess, of urea in concentrated aqueous solution at from 80° C. to 120° C. The reaction takes from one hour to 15 hours. The ammonia produced during the reaction is advantageously removed from the reaction mixture using an inert gas, for example nitrogen. If the product crystallizes out after cooling to room temperature, analytically pure polyurea can be isolated by washing several times with ice-water and a little methanol.

The polyurea derivatives can, depending on the chemical composition, also be employed as 60-80% strength aqueous solutions. Suitable for increasing the solubility in water are reaction products with formaldehyde in which from 0.1 to 0.9 mole of formaldehyde per urea group is employed for the hydroxymethylation of the urea derivatives. An adequate increase in the solubility in water can be achieved with only 0.1 to 0.3 mole of formaldehyde per urea group. The colorless aqueous hydroxymethylated polyurea solutions obtained in this way are very stable on storage.

Preferred polyureas are:

dipropylenetrisurea

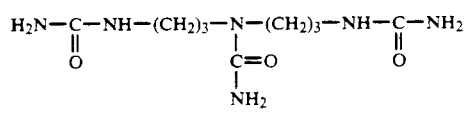

hexamethylenediurea

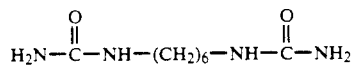

4,7-dioxadecane-1,10-diurea

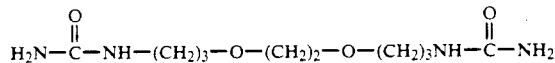

diethylenetrisurea

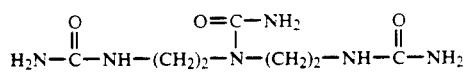

The resin solution according to the invention is prepared by adding the hydroxymethylated or unhydroxymethylated polyurea in solid form or as aqueous solution to the aqueous precondensate. It is also possible to add the polyurea during the preparation of the resin solution, i.e. to prepare this resin in the presence of the polyurea. Finally, the polyurea can also be added only when the impregnation liquor is being prepared.

The resin solutions modified in this way have solids content in the region of 40-70% by weight, particularly advantageously 45-65% by weight.

The resin solution contains 2-40 parts by weight of the polyurea, based on 100 parts by weight of the melamine/formaldehyde precondensate (solids in each case). For use in CPL, 10-30 parts by weight of polyurea are preferred, and for the production of paper coatings by the short-cycle process, preferably 5-20 parts by weight of polyurea are employed.

For use as impregnation liquor, the resin solutions are mixed in the conventional way with proton-supplying compounds as hardeners. Examples of suitable hardeners are maleic acid, ammoniumsulfite, ethanolamine hydrochloride, dimethylethanolammonium sulfite and combinations such as morpholine/p-toluenesulfonic acid, N-methylethanolamine/SO$_2$ or N-methylethanolamine/ethanolamine/SO$_2$.

The hardeners can be added to the impregnation liquor in amounts of from 0.1 to 5% by weight. The amount of hardener depends on the industrial use requirements, and it is possible to adjust the reactivity of the resin solution/hardener mixtures appropriately by, for example, measuring the cloud times and gelling times.

It is also possible to add auxiliaries such as wetting agents, to the impregnation liquors. Examples of suitable wetting agents are ethoxylated fatty alcohols or alkylphenol ethoxylates, which can be present in amounts of from 0.2 to 1.0% by weight in the liquor.

The CP laminates are produced by initially impregnating the decorative papers and core layer papers with the resin solutions according to the invention. The decorative papers normally have area weights in the range from 60 to 150 g/m$^2$. The amount of resin applied in the impregnation of decorative paper is about 90-150% of the weight of the paper. The residual moisture content is adjusted to about 5-7%. Employed as core layers are kraft crepe papers with area weights in the range from 80 to 160 g/m$^2$. The amount of resin applied is from 80 to 110% of the weight of the paper. The residual moisture content is likewise adjusted to 5-7%.

In specific cases it is also possible to impregnate papers with a weight of 300 g/m$^2$ by application of 30-70% by weight of resin, or overlay papers with a weight of about 20 g/m$^2$ by application of up to 300% by weight of resin, based on the paper weight. On the industrial scale, the resin is applied by means of impregnation machines. The preferred continuous pressed laminate (CPL) process can be used to produce decorative laminates by compressing two or three kraft crepe papers and a decorative paper, each impregnated with the impregnation liquors according to the invention, and at pressures in the range 20-50 bar and at 160°-190° C. for 20-60 s, preferably in a twin belt press. During this there is probably a chemical reaction between the melamine/formaldehyde precondensate and the polyurea leading to substantial crosslinking of the reaction product. It is possible to make advantageous use of the high reactivity of the melamine resins in this very rapid CPL process. However, it is also possible to employ the papers impregnated according to the invention in the discontinuous high pressure laminate (HPL) process, in which compression takes place under pressures of 70-100 bar, at 120°-160° C. and with residence times of from 10 to 60 min. In this case it is also possible to employ papers impregnated with phenolic resins, in addition to the paper layers impregnated according to the invention, in the core layer. It is also possible to reduce the residence time in the press to as little as 2 min (short-cycle laminates).

These laminates can be bonded to commercial chipboard with, for example, UF adhesive or white glue.

For the production of paper film and subsequent coating by the short-cycle process, decorative papers area weights in the range from 60 to 150 g/m$^2$ are impregnated. The amount of resin applied is 120-150% of the weight of the paper. The residual moisture content is again adjusted to about 5-7%. The decorative films produced in this way are compressed with the woodbase material (commercial chipboard) by the short-cycle process (SC film) at 150°-210° C. under pressures from 15 to 30 bar for 20-60 s.

It is also possible to use the resin solutions according to the invention for producing bonded fiber webs.

Examples of the production of laminates

A. Preparation of the resin solutions

Resolution solution 1

A mixture of 1180 g of 40% by weight aqueous formaldehyde and 537 g of water was maintained at 30° C. The pH was adjusted to about 9 with 2N aqueous sodium hydroxide solution, and then 1232 g of melamine were added. The mixture was then heated to 98°–100° C., the pH slowly falling, and was stirred at pH 8.6–8.8 for about 120 min. As soon as a sample of the reaction mixture showed a cloud point of about 50° C., the clear solution was mixed with 17.5% by weight, based on the solids content of the unmodified resin solution, of dipropylenetrisurea as 75% strength aqueous solution (partially mathylolated with formaldehyde in the DPTU:Of molar ratio 1:0.5, cancelling the small fall in pH with 2N aqueous sodium hydroxide solution, and then immediately cooled to room temperature. The pH was adjusted to about 10 with 2N aqueous sodium hydroxide solution if necessary.

Viscosity (at 20° C.): 70 mPa.s

Resin solution 2

Starting materials and preparation conditions as for 1. 20.5% by weight, not 17.5% by weight, of dipropylenetrisurea (partially methylolated with formaldehyde in the DPTU:Fo molar ratio 1:0.5), based on the solids content of the unmodified resin solution, were added at the end of the condensation.

Viscosity (at 20° C.): 50 mPa.s

Resin solution 3

A mixture of 811.5 g of 40% by weight aqueous formaldehyde and 358 g of water was heated to 30° C. and then adjusted to pH about 9 with 2N aqueous sodium hydroxide solution. Subsequently 17.5% by weight of 4,7-dioxadecane-1,10-diurea, based on the solids content of the unmodified resin solution, and 821.6 g of melamine were added. The mixture was heated to 100° C., the pH slowly falling. and stirred at pH 8.6–8.8. After the cloud point had reached about 48° C., the mixture was immediately cooled to room temperature. The pH was adjusted to about 10 with 2N sodium hydroxide solution.

Viscosity (at 20° C.): 80 mPa.s

Resin solution 4 (prior art)

Aqueous resin solution based on melamine and formaldehyde in the molar ratio 1:1.6. Modification with 3% caprolactam, 3% sucrose and 3% diethylene glycol, each based on the solids content of the unmodified resin solution.

Viscosity (at 20° C.): 50 mPa.s
Solids content: 60% by weight

B. Preparation of the impregnation liquors for laminate production

The impregnation liquors were prepared by adjusting the resin solutions to a solids content of about 50% by weight and subsequently adding sufficient 85% by weight solution of the BASF 529 FL hardener (product of the reaction of an organic amine with sulfurous acid) (0.2–0.8% of the weight of the resin solution) for the resin liquor to have a cloud time of about 6.5 min. 0.3% by weight of a commercial alkylphenol ethoxylate wetting agent was also added to the resin solution.

C. Production of laminates

Two kraft crepe papers with an area weight of 135 g/m² and a printed decorative paper (oak pattern) with an area weight of 80 g/m² were impregnated. The amount of resin applied in the impregnation of the kraft crepe paper was about 100% and in that of the decorative paper was about 120%, each based on the paper weight. In both cases, the residual moisture content was adjusted to about 6.5% by drying the paper at 140° C.

The papers were compressed at 165° C. under a pressure of 50 bar for 30 s to give the laminate.

D. Test methods

1. Shapability of the laminates

To test the shapability, specimens (165 × 90 mm) were cut out of the laminate and clamped in a DIN 53799 bending tester. The bending point was heated to 140° C. and then bent through a radius of 6 mm. The shapability is assessed by the following criteria:
Score 1 Satisfactory bending without crack
Score 2 Bent, but small crack below 1 cm
Score 3 Bent, but with crack above 1 cm
Score 4 Kinked
Score 5 Laminate fractured 2. Boiling test The specimen is treated with boiling water for 2 h. It is subsequently placed in cold water for 5 min, then removed, dried and examined for visible changes on the surface and the bonding (blistering etc.).

3. DIN 53 799 steam test

The specimen was examined for changes (blisters, loss of gloss) in the decorative surface after treatment with steam for 1 h. The loss of gloss is determined using a gloss tester which displays the result directly in % reflection.

| | E. Results of the tests | | | |
|---|---|---|---|---|
| | Resin solution 1 | Resin solution 2 | Resin solution 3 | Resin solution 4 |
| Shapability | | | | |
| Score | 1 | 1 | 1 | 4 |
| Boiling test | No blisters | No blisters | No blisters | Blistering |
| Seam test | | | | |
| Gloss before | 17% | 16% | 15% | 14% |
| after | 19% | 17% | 16% | 8% |

Example of use in short-cycle film coating

A. Preparation of resin solution 5

Starting materials and preparation process as for 1. At the end of the condensation, 13% by weight, based on the solids content of the unmodified resin, of dipropylenetrisurea (partially methylolated with formaldehyde in the DPTU:Fo molar ratio 1:0.5) were added.

B. Preparation of the impregnation liquor

The impregnation liquor was prepared by adjusting resin solution 5 to a solids content of 55% by weight with water, and adding 0.3% by weight, based on the resin solution, of a commercial alkylphenol ethoxylate wetting agent. The cloud time was adjusted to about 5 min with an 85% by weight aqueous solution of the 529 FL hardener.

C. Impregnation and coating

White decorative papers with an area weight of 80 g/m² were impregnated. The amount of resin applied was about 120%, and the residual moisture content was adjusted to about 6.5%. The decorative films produced in this way were pressed onto conventional coatable chipboard by the short-cycle process under 20 bar at 190° C. for 35 s.

The result was a furniture component with hard and continuous surface coating which still had excellent gloss after treatment with steam.

We claim:

1. An aqueous resin solution for impregnating paper webs which contain 2–40 parts by weight (based on solids) of a polyurea of the formula

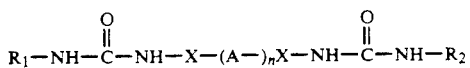

with A =
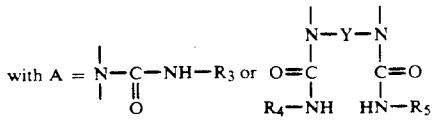

Y = $C_1$-$C_6$-alkylene
n = 0 or 1
X = $C_1$=$C_6$-alkylene, $C_5$-$C_6$-cycloalkylene, $C_1$-$C_6$-hydroxyalkylene or $C_4$-$C_{18}$-oxyalkylene,
$R_1$-$R_5$ = H or $CH_2OH$ per 100 parts by weight of a melamine/formaldehyde precondensate.

2. An impregnation liquor containing a resin solution as claimed in claim 1, which contains from 0.1 to 5 parts by weight of a proton-supplying compound as hardner, and conventional auxiliaries.

* * * * *